May 13, 1941.　　　J. W. HARRIS　　　2,242,068
WHEELBARROW
Filed Feb. 23, 1940
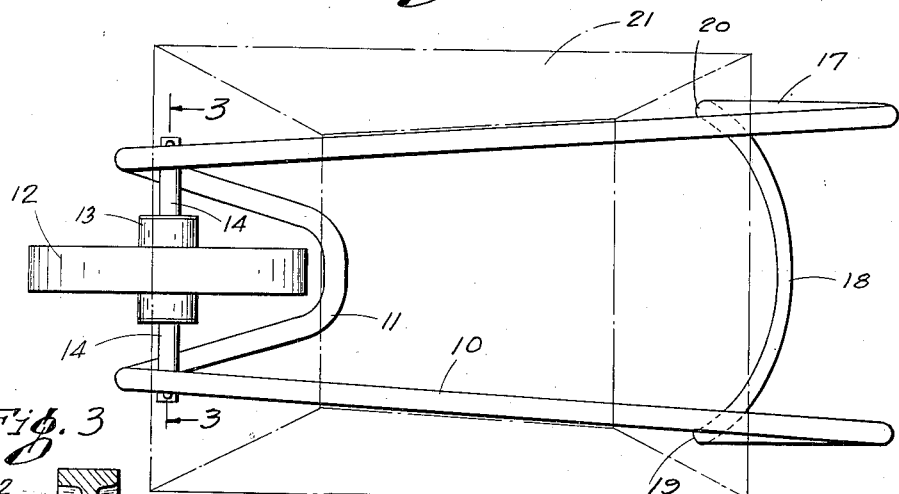
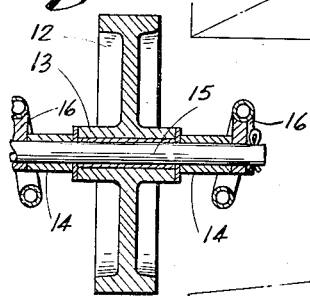
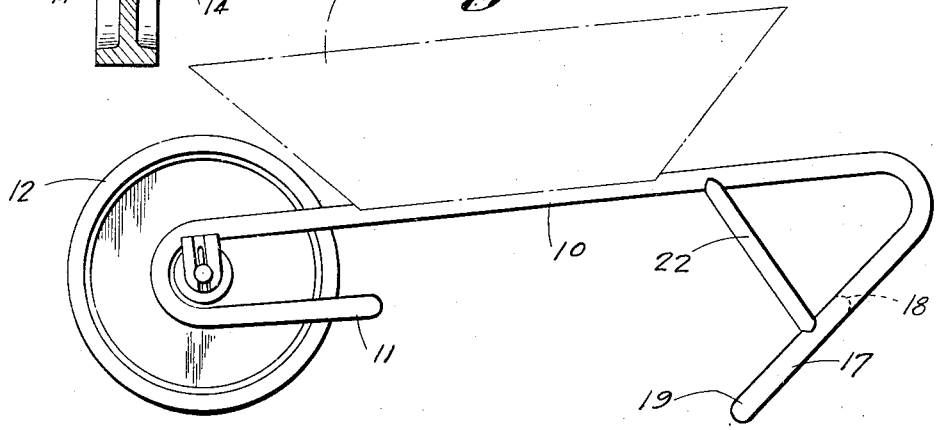
INVENTOR.
JAMES W. HARRIS
BY
ATTORNEYS.

Patented May 13, 1941

2,242,068

UNITED STATES PATENT OFFICE 2,242,068

WHEELBARROW

James W. Harris, Bedford, Ohio, assignor to The Palode Engineering Company, Cleveland, Ohio, a corporation of Ohio Application February 23, 1940, Serial No. 320,275

2 Claims. (Cl. 280—52)

This invention relates to wheelbarrows and more specifically to improvements in the construction thereof.

One of the objects of the invention is to provide a wheelbarrow having the frame member formed of a single piece of light gauge steel tubing.

Another object of the invention is to provide a wheelbarrow having an end portion of the frame member curved downwardly and rearwardly for supporting the rotatable wheel and axle of the wheelbarrow.

Another object of the invention is to provide a wheelbarrow having an end portion of the frame member bent downwardly and inwardly to provide hand grips which are curved in the plane of the frame to facilitate the handling of said wheelbarrow with greater ease.

Another object of the invention is to provide a wheelbarrow having an end portion of the frame member bent downwardly and inwardly for maintaining the wheelbarow in a horizontal position while the same is in its immobile state.

Other objects and advantages more or less ancillary of the foregoing and the manner in which all the various objects are realized will appear in the following description which, considered in connection with the accompanying drawing, sets forth the preferred embodiment of the invention.

Referring to the drawing:

Fig. 1 is a top plan view of the wheelbarrow with the outline of the pan thereof shown in dotted lines;

Fig. 2 is a side elevational view of the wheelbarrow with the pan thereof shown in dotted lines; and Fig. 3 is a sectional view through the wheel and axle showing the manner of assembly thereof upon the frame member, the section being taken on a plane indicated by the line 3—3 of Fig. 1.

Referring to Fig. 1, the frame member 10 of the wheelbarrow is formed of a continuous loop of light gauge steel tubing with the sides of the frame diverging from the forward end thereof. An end portion 11 of the frame member 10 is curved downwardly and projects rearwardly to form a guide yoke for the rotatable wheel 12.

The hub 13 of the wheel has secured to both ends thereof a tube 14 which tube extends through the forward curved section of the end portion 11 of the frame member. A rod 15 projects through the hub 13 and tube 14 with the end portions thereof being pressed into the brackets or blocks 16. The blocks 16 are formed with concave faces which are welded or otherwise affixed to the end portion 11 of the side frame members.

As shown in Fig. 2, the opposed end portion 17 of the frame member 10 is curved downwardly and forwardly to provide legs 19 and 20 for the retention of the wheelbarrow in a horizontal position. The transverse member 18 of the end portion 17 is arched intermediate the legs 19 and 20 to facilitate freedom of movement by the operator during the operation of the device.

A pan 21 is secured by welding or other suitable means to the frame member 10, the pan being preferably disposed nearer the end portion 11 than the opposed end, so that the greater portion of the load may be borne by the wheel 12.

Diagonal braces 22 are mounted between the frame member 10 and the downwardly extending members in the end portion 17, these braces being provided to reinforce the general structure of the handles and to sustain the weight imposed upon the legs 19 and 20 when the loaded wheelbarrow is set in a horizontal position.

As is customary in the general use of a wheelbarrow the operator often endeavors to discharge the load carried therein by tipping the wheelbarrow forwardly over the wheel. In the execution of this operation the operator frequently loses his balance or fails to completely discharge the load carried in the pan due to his inability to rock the wheelbarorw to the point where the contents of the pan will be discharged by gravity. However, by the use of the downwardly curved end portion 17 of applicant's structure the operator in tipping the wheelbarrow may slide has hands down said end portion and thus secure a firmer grip and better control of the device during the manipulation thereof. The use of a light gauge steel tube for the frame member of the wheelbarrow so lessens the weight thereof as to permit the operator to proceed with his duties without fatigue and with greater dispatch.

Although the foregoing description is necessarily of a detailed character, in order that the invention may be completely set forth, it is to be understood that the specific terminology is not intended to be restrictive or confining, and that the various rearrangements of parts and modifications of detail may be resorted to without departing from the scope or spirit of the invention as herein claimed.

I claim:

1. A wheelbarrow comprising, a frame member, an axle mounted thereon, a wheel mounted on said axle, said frame member being bent from a tube of relatively light gauge stock to form a continuous loop, the side rails of said frame being disposed in divergent relation, one end portion of the frame member being bent downwardly and inwardly to provide vertical arcuate hand grips, downwardly extending sections merged with said hand grips, braces affixed between said side portions of the frame and said downwardly extending sections, the opposed end portion of the frame being curved downwardly and extending rearwardly in a plane parallel the side rails, and a pan mounted on said frame side rails.

2. A wheelbarrow comprising, a frame member, an axle mounted thereon, a wheel mounted on said axle, said frame member embodying a single length of light steel tubing bent to form a continuous loop with lineal side portions therein diverging from one end, one end portion of the frame member being bent downwardly and inwardly, the opposed end portion of the frame being curved downwardly and extending rearwardly in a plane parallel to the lineal side portions subjacent said axle for reinforcing said frame member, the first named end portion being arched intermediate its lineal side portions for the reinforcement of said frame member and a pan secured to said lineal side portions of the frame.

JAMES W. HARRIS.